(12) United States Patent
Varanasi et al.

(10) Patent No.: US 10,780,673 B2
(45) Date of Patent: Sep. 22, 2020

(54) LIGHT EMITTING DIODE DISPLAY AND INSULATED GLASS UNIT INCLUDING THE SAME

(71) Applicant: PILKINGTON GROUP LIMITED, Lathom (GB)

(72) Inventors: Srikanth Varanasi, Ottawa Hills, OH (US); Neil McSporran, Perrysburg, OH (US)

(73) Assignee: Pilkington Group Limited, Lathom (GB)

( * ) Notice: Subject to any disclaimer, the term of this patent is extended or adjusted under 35 U.S.C. 154(b) by 21 days.

(21) Appl. No.: 16/092,011

(22) PCT Filed: Apr. 7, 2017

(86) PCT No.: PCT/GB2017/050987
§ 371 (c)(1),
(2) Date: Oct. 8, 2018

(87) PCT Pub. No.: WO2017/175007
PCT Pub. Date: Oct. 12, 2017

(65) Prior Publication Data
US 2019/0134952 A1     May 9, 2019

Related U.S. Application Data

(60) Provisional application No. 62/320,138, filed on Apr. 8, 2016.

(51) Int. Cl.
| | | |
|---|---|---|
| *B32B 17/10* | (2006.01) | |
| *G02B 5/22* | (2006.01) | |
| *F21V 8/00* | (2006.01) | |

(52) U.S. Cl.
CPC .. *B32B 17/10055* (2013.01); *B32B 17/10036* (2013.01); *B32B 17/10119* (2013.01);
(Continued)

(58) Field of Classification Search
None
See application file for complete search history.

(56) References Cited

U.S. PATENT DOCUMENTS

| | | |
|---|---|---|
| 4,354,739 A | 10/1982 | Scanlon et al. |
| 5,308,805 A | 5/1994 | Baker et al. |

(Continued)

FOREIGN PATENT DOCUMENTS

| | | |
|---|---|---|
| JP | 2003-034560 A | 2/2003 |
| WO | 2007/077239 A1 | 7/2007 |

OTHER PUBLICATIONS

European Patent Office, International Search Report with Written Opinion, dated Jun. 19, 2017, 11 pages, European Patent Office, Rijswijk, Netherlands.

*Primary Examiner* — Elmito Breval
(74) *Attorney, Agent, or Firm* — Marshall & Melhorn, LLC (57) ABSTRACT

A light emitting diode display is described including inner and outer panes of glass. The inner pane of glass has first and second major surfaces wherein a visible light reflection from the second major surface is 7.6% or less. The outer pane of glass is in a parallel relationship with the inner pane of glass. One or more light emitting diodes (LEDs) and at least one (a first) interlayer is provided between the inner and outer panes of glass. The first interlayer encapsulates the one or more LEDs. A conductive coating may be formed over the first major surface of the inner pane of glass and at least one (a first) of the one or more LEDs may be provided on the conductive coating, the first light emitting diode being in electrical communication with the conductive coating. The conductive coating may be transparent to visible light.

20 Claims, 4 Drawing Sheets

(52) U.S. Cl.
CPC .. *B32B 17/10211* (2013.01); *B32B 17/10541* (2013.01); *B32B 17/10651* (2013.01); *B32B 17/10761* (2013.01); *B32B 17/10788* (2013.01); *G02B 5/226* (2013.01); *G02B 6/0021* (2013.01)

(56) References Cited

U.S. PATENT DOCUMENTS

| | | |
|---|---|---|
| 5,650,365 A | 7/1997 | Higby et al. |
| 5,747,398 A | 5/1998 | Higby et al. |
| 5,811,923 A | 9/1998 | Zieba et al. |
| 6,165,598 A | 12/2000 | Nelson |
| 6,353,501 B1 | 3/2002 | Woodruff et al. |
| 6,490,091 B1 | 12/2002 | Woodruff et al. |
| 7,253,953 B2 | 8/2007 | Browning |
| 7,817,327 B2 | 10/2010 | Derda |
| 8,044,415 B2 | 10/2011 | Messere et al. |
| 9,434,635 B2 | 9/2016 | Horsley |
| 9,492,575 B2 | 11/2016 | Holub et al. |
| 10,042,089 B2 | 8/2018 | Varanasi |
| 10,101,503 B2 | 10/2018 | Varanasi |
| 2002/0075203 A1 | 6/2002 | Woodruff et al. |
| 2009/0219468 A1 | 9/2009 | Barton et al. |
| 2015/0273092 A1 | 10/2015 | Holub et al. |

//LIGHT EMITTING DIODE DISPLAY AND INSULATED GLASS UNIT INCLUDING THE SAME

CROSS-REFERENCE TO RELATED APPLICATION

This application is claiming the benefit, under 35 U.S.C. 119(e), of the provisional U.S. patent application which was granted Ser. No. 62/320,138 and filed on Apr. 8, 2016, the entire disclosure of which is hereby incorporated by reference.

BACKGROUND OF THE INVENTION

The invention relates to a light emitting diode (LED) display and in particular, a transparent LED display. The invention also relates to an insulated glass unit including the LED display.

Displays have been integrated into the facades and interior walls of buildings. Such displays are utilized to show an image for advertising or decoration. Unfortunately, the images shown by such displays suffer from poor contrast due to the reflection from the exposed surfaces and inner interfaces of the display. Also, the reflection from the inner interfaces of the display has been found to be distracting to viewers of the display.

To combat poor contrast, filters or screens have been provided adjacent the emitting surfaces of displays to improve contrast. However, filters known in the art are bulky and expensive. Also, such arrangements require the filter and display to be provided as separate bodies. Providing a bulky filter separately adds bulk to the display assembly increasing its size and complexity.

Thus, it would be desirable to provide a display with improved contrast enhancement. It would also be desirable to reduce the cost and complexity of the display by including a filter within the display.

Accordingly from a first aspect the present invention provides a light emitting diode display comprising: an inner pane of glass having a first major surface and a second major surface, wherein a visible light reflection (Illuminant D65, 10 degree observer) from the second major surface of the inner pane of glass is 7.6% or less; an outer pane of glass in a parallel relationship with the inner pane of glass; one or more light emitting diodes provided between the inner pane of glass and the outer pane of glass; and at least one (a first) interlayer provided between the inner pane of glass and the outer pane of glass, wherein the first interlayer encapsulates the one or more light emitting diodes.

In some embodiments a conductive coating is formed over the first major surface of the inner pane of glass and at least one (a first) of the one or more light emitting diodes is provided on the conductive coating, the first light emitting diode being in electrical communication with the conductive coating.

Preferably the conductive coating is in direct contact with the first major surface of the inner pane of glass.

Preferably the conductive coating is in the form of at least one track.

Preferably the conductive coating is divided into one or more (first and second) electrically insulated regions, and the first light emitting diode is in electrical communication with the first and second regions of the conductive coating.

Preferably the conductive coating is transparent to visible light.

Preferably at least one of the one or more light emitting diodes is provided directly on the conductive coating.

Preferably the conductive coating comprises fluorine doped tin oxide or antimony doped tin oxide and has a sheet resistance of 5-50 ohm/sq, preferably a sheet resistance of 5-25 ohm/sq.

Preferably the conductive coating is provided in a grid-like pattern.

In some embodiments a conductive coating is formed on a carrier ply, and at least one (a first) of the one or more light emitting diodes is provided on the conductive coating on the carrier ply, the first light emitting diode being in electrical communication with the conductive coating on the carrier ply.

Preferably the conductive coating on the carrier ply is in the form of at least one track.

Preferably the conductive coating on the carrier ply is divided into one or more (first and second) electrically insulated regions, and the first light emitting diode is in electrical communication with the first and second regions of the conductive coating on the carrier ply.

Preferably the conductive coating on the carrier ply is transparent to visible light.

Preferably the carrier ply is transparent to visible light.

Preferably the carrier ply comprises at least one of PET, polyimide and glass.

Preferably the light emitting diode display further comprises a second interlayer, the carrier ply being between the first interlayer and second interlayer, the second interlayer being between the carrier ply and the inner pane of glass. Preferably the second interlayer is body tinted, preferably having a lower transparency to visible light than the first interlayer.

Preferably the light emitting diode display comprises a third interlayer between the first interlayer and a second interlayers, wherein the carrier ply is located in a cut-out region in the third interlayer. Preferably the second interlayer is body tinted, preferably having a lower transparency to visible light than the first interlayer.

Preferably at least one of the one or more light emitting diodes is provided directly on the conductive coating.

Preferably the conductive coating comprises fluorine doped tin oxide or antimony doped tin oxide and has a sheet resistance of 5-50 ohm/sq, preferably a sheet resistance of 5-25 ohm/sq.

Preferably the conductive coating is provided in a grid-like pattern.

Other embodiments have other preferable features.

Preferably visible light reflection (Illuminant D65, 10 degree observer) from the second major surface of the inner pane of glass is 7.0% or less.

Preferably the color (Illuminant D65, 10 degree observer) of the light transmitted through the display has an a* value in the range of 6 to −6 and a b* value in the range of 6 to −6.

Preferably the outer pane of glass is clear and has an a* value in the range of −2 to 2 and a b* value in the range of −2 to 2 in the CIELAB color scale system (Illuminant D65, 10 degree observer).

Preferably the inner pane of glass is of a grey color and comprises 1.2-2.0 weight % $Fe_2O_3$ (total iron).

Preferably the inner pane of glass has a visible light transmission (Illuminant D65, 10 degree observer) of 39-48%.

Preferably the inner pane of glass has a visible light transmission (Illuminant D65, 10 degree observer) of 55-65%.

Preferably the inner pane of glass is of a grey-blue color and has an a* value in the range of −4 to −2 and a b* value in the range of −9 to −5 in the CIELAB color scale system (Illuminant D65, 10 degree observer).

In some embodiments the light emitting diode display further comprises an anti-reflective coating formed on the first major surface of the outer pane of glass.

Preferably the anti-reflective coating comprises at least one layer of tin oxide or titanium dioxide and at least one layer of silicon dioxide.

Preferably the anti-reflective coating is color neutral and a visible light reflection (Illuminant D65, 10 degree observer) measured from a side facing the first major surface of the outer pane of glass is 5.0% or less.

From a second aspect the present invention provides a light emitting diode display comprising: an inner pane of glass having a first major surface; an outer pane of glass in a parallel relationship with the inner pane of glass; an anti-reflective coating formed on a first major surface of the outer pane of glass, wherein a visible light reflection measured from a side facing the first major surface of the outer pane of glass is less than a visible light reflection from a second major surface of the inner pane of glass; a conductive coating spaced apart from the anti-reflective coating; one or more light emitting diodes provided between the inner pane of glass and the outer pane of glass, the one or more light emitting diodes being in electrical communication the conductive coating; and at least one (a first) interlayer provided between the inner pane of glass and the outer pane of glass, wherein the first interlayer encapsulates the one or more light emitting diodes.

Preferably the conductive coating is transparent to visible light.

Preferably the conductive coating is formed on the first major surface of the inner pane of glass.

In some embodiments of the second aspect of the present invention the conductive coating is formed on a carrier ply.

Preferably the carrier ply is transparent to visible light.

Preferably the carrier ply comprises at least one of PET, polyimide and glass.

Preferably the light emitting diode display further comprises a second interlayer, wherein the carrier ply is between the first and second interlayers. Preferably the second interlayer is body tinted, preferably having a lower transparency to visible light than the first interlayer.

Preferably the light emitting diode display further comprises a third interlayer between the first interlayer and a second interlayer, wherein the carrier ply is located in a cut-out region in the third interlayer and wherein the second interlayer is between the carrier ply and the inner pane of glass. Preferably the second interlayer is body tinted, preferably having a lower transparency to visible light than the first interlayer.

In other embodiments of the second aspect of the present invention, the visible light reflection measured from the side facing the first major surface of outer pane of glass is at least 0.5% less than the visible light reflection from the second major surface of the inner pane of glass.

In other embodiments of the second aspect of the present invention the inner pane of glass is of a grey color or a grey-blue color and the visible light transmitted through the display has an a* value in the range of 6 to −6 and a b* value in the range of 6 to −6 in the CIELAB color scale system (Illuminant D65, 10 degree observer).

From a third aspect the present invention provides a light emitting diode display comprising: an inner pane of glass; an outer pane of glass in a parallel relationship with the inner pane of glass; a conductive coating formed on a first major surface of the inner pane of glass, wherein the conductive coating comprises an antimony doped tin oxide layer and has a sheet resistance of 5-50 ohm/sq.; one or more light emitting diodes provided between the inner pane of glass and the outer pane of glass; and at least one (a first) interlayer provided between the inner pane of glass and the outer pane of glass, wherein the first interlayer encapsulates the one or more light emitting diodes.

Preferably the conductive coating on the first major surface of the inner pane of glass is transparent to visible light.

Preferably the one or more light emitting diodes are in electrical communication the conductive coating on the first major surface of the inner pane of glass.

In some embodiments of the third aspect of the present invention the one or more light emitting diodes are mounted on a carrier ply, the carrier ply being provided with a conductive coating for providing electrical power to at least one of the one or more light emitting diodes.

Preferably the conductive coating on the carrier ply is transparent to visible light.

Preferably the carrier ply is transparent to visible light.

Preferably the carrier ply comprises at least one of PET, polyimide and glass.

Preferably the light emitting diode display further comprises a second interlayer, wherein the carrier ply is between the first and second interlayers. Preferably the second interlayer is body tinted, preferably having a lower transparency to visible light than the first interlayer.

Preferably the light emitting diode display further comprises a third interlayer between the first interlayer and a second interlayer, wherein the carrier ply is located in a cut-out region in the third interlayer and wherein the second interlayer is between the carrier ply and the inner pane of glass. Preferably the second interlayer is body tinted, preferably having a lower transparency to visible light than the first interlayer.

From a fourth aspect the present invention provides an insulated glass unit comprising a light emitting diode display according to first, second or third aspects of the present invention, the light emitting diode display oriented in a parallel, spaced apart relationship with one or more panes of glass.

BRIEF SUMMARY OF THE INVENTION

Embodiments of a light emitting diode display are provided.

In an embodiment, the display comprises an inner pane of glass having a first major surface and a second major surface. A visible light reflection (Illuminant D65, 10 degree observer) from the second major surface of the inner pane of glass is 7.6% or less. An outer pane of glass is in a parallel relationship with the inner pane of glass. A transparent conductive coating is formed over the first major surface of the inner pane of glass. One or more light emitting diodes are provided on the transparent conductive coating and between the inner pane of glass and the outer pane of glass. The one or more light emitting diodes are in electrical communication with the transparent conductive coating. An interlayer is provided between the inner pane of glass and the outer pane of glass. The interlayer encapsulates the one or more light emitting diodes.

In another embodiment, the display comprises an inner pane of glass having a first major surface and an outer pane of glass in a parallel relationship with the inner pane of glass.

An anti-reflective coating is formed on a first major surface of the outer pane of glass. A visible light reflection measured from a side facing the first major surface of the outer pane of glass is less than a visible light reflection from a second major surface of the inner pane of glass. A conductive coating is spaced apart from the anti-reflective coating and formed on the first major surface of the inner pane of glass. One or more light emitting diodes is provided between the inner pane of glass and the outer pane of glass. The one or more light emitting diodes is in electrical communication with the conductive coating. An interlayer is provided between the inner pane of glass and the outer pane of glass. The interlayer encapsulates the one or more light emitting diodes.

In yet another embodiment, the display comprises an inner pane of glass and an outer pane of glass in a parallel relationship with the inner pane of glass. A conductive coating is formed on a first major surface of the inner pane of glass. The conductive coating comprises an antimony doped tin oxide layer and has a sheet resistance of 5-50 ohm/sq. One or more light emitting diodes is provided between the inner pane of glass and the outer pane of glass. The one or more light emitting diodes is in electrical communication the conductive coating. An interlayer is provided between the inner pane of glass and the outer pane of glass. The interlayer encapsulates the one or more light emitting diodes.

Embodiments of an insulated glass unit comprising an embodiment of the light emitting diode display are also provided.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific displays, assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
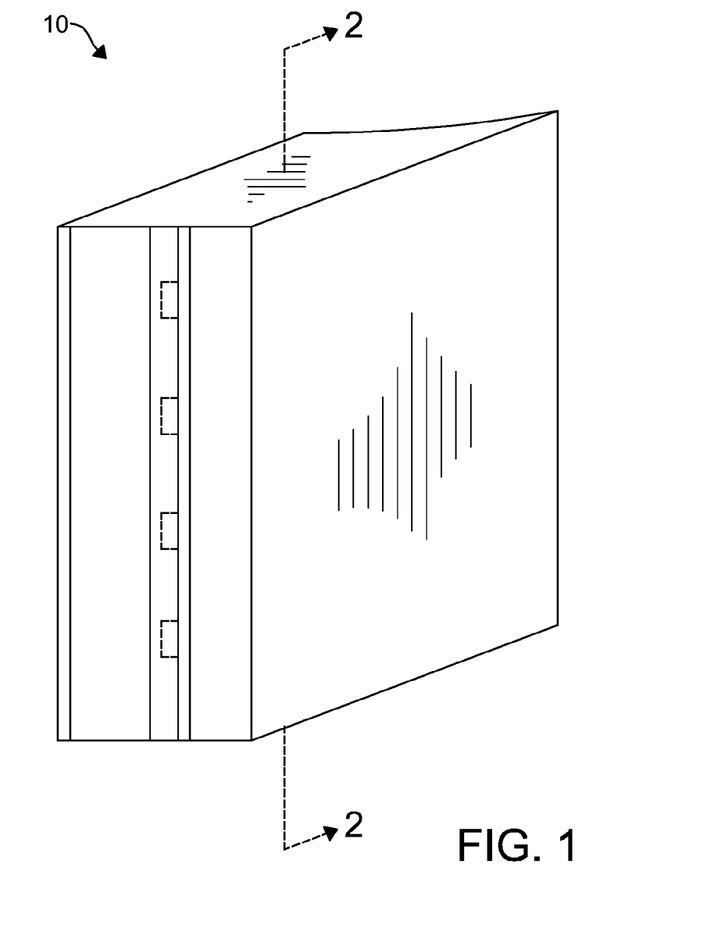
FIG. 1 is a perspective view of an LED display in accordance with the invention.

Referring now to the figures, there is illustrated in FIG. 1 an LED display 10. The LED display 10 will be described in connection with a glazing for a building. It would be understood by one of ordinary skill in the art that the present invention could have commercial or residential applications or be utilized as a vehicle glazing.

The LED display 10 may be installed in any appropriate opening in the building. However, it is preferred that the LED display 10 is installed in an opening in an exterior surface or an interior surface of the building. Nonetheless, it should be appreciated that the LED display could be utilized in other locations in the building such as, for example, in a partition, handrail, floor, or ceiling of the building.

Figure 2:
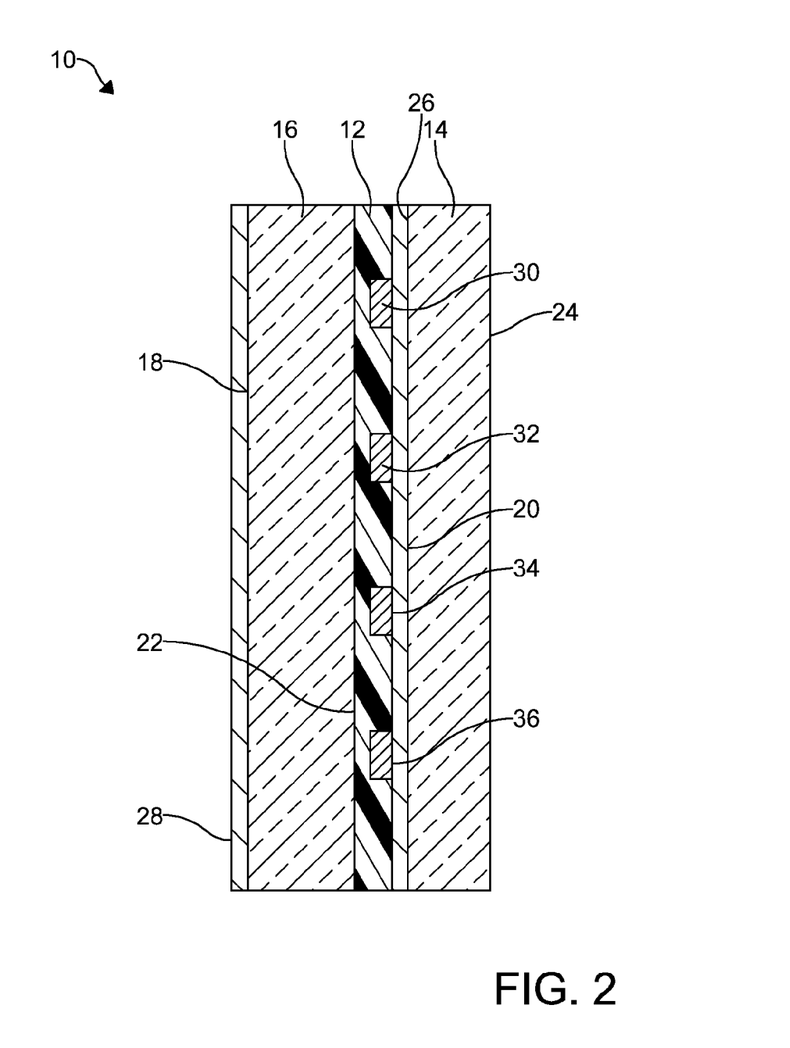
FIG. 2 is a cross-sectional view of the LED display of FIG. 1 taken along line 2-2.

As best illustrated in FIG. 2, the LED display 10 comprises an interlayer 12 provided between an inner pane of glass 14 and an outer pane of glass 16. The inner pane of glass 14 and outer pane of glass 16 are in a parallel relationship with each other. The inner pane 14 and outer pane 16 each have a first major surface 18, 20 and a second major surface 22, 24. In an embodiment, the first major surface 18 of the outer pane 16 faces the exterior environment, the second major surface 24 of the inner pane 14 faces the interior of the building and the first major surface 20 of the inner pane 14 and the second major surface 22 of the outer pane 16 face each other. In this embodiment, the interlayer 12 is provided between the first major surface 20 of the inner pane 14 and the second major surface 22 of the outer pane 16.

Preferably, the interlayer 12 is substantially transparent to visible light. The interlayer 12 may be of a polymeric material. Such materials include, for example, polyvinyl butyral (PVB), ethyl vinyl acetate (EVA), or a similar polymer. In other embodiments, the interlayer 12 may be formed of a resin. For example, the interlayer 12 may be formed from a liquid resin. When the interlayer 12 is formed from a liquid resin, the liquid resin may be sold under the trademark UVEKOL and sold by Allnex or another resin having similar properties. Preferably, the interlayer 12 is provided as a sheet of material in a shape substantially matched to that of the inner pane of glass 14 and outer pane of glass 16. In an embodiment, the interlayer has a thickness of 0.76 millimeters (mm). In this embodiment, the interlayer may comprise two sheets of one or more of the aforementioned materials with each sheet having a thickness of 0.38 mm. However, it should be appreciated that the LED display could be formed with an interlayer of another thickness.

To form the LED display 10, the inner pane of glass 14 and outer pane of glass 16 may be laminated to each other or are otherwise adhered together via the interlayer 12. Lamination processes known in the art are suitable for adhering the inner pane of glass 14 to the outer pane of glass 16 via the interlayer 12 and forming the LED display 10. Generally, such lamination processes will include inserting the interlayer 12 between the inner pane of glass 14 and the outer pane of glass 16 and subjecting the interlayer 12 and panes 14, 16 to a predetermined temperature and pressure.

The inner pane of glass 14 is not limited to a particular thickness. In certain embodiments, the inner pane of glass 14 is substantially transparent to visible light. In an embodiment, the inner pane of glass 14 is of a soda-lime-silica composition. However, in other embodiments, the inner pane of glass 14 may be of another composition. For example, in an embodiment, the inner pane of glass 14 may be of a borosilicate or aluminosilicate glass composition. The inner pane of glass 14 may comprise about 1000 parts per million (ppm) or less $Fe_2O_3$. In certain embodiments, it may be preferable that the inner pane of glass 14 has a low iron content. For describing the embodiments of the LED display 10, low iron content shall mean that the composition of the pane of glass comprises 500 parts per million (ppm)

or less $Fe_2O_3$. In these embodiments, the composition of the pane of glass 14, 16 may comprise 70-200 ppm $Fe_2O_3$.

The color of the inner pane of glass 14 can vary between embodiments of the LED display 10. In an embodiment, the inner pane of glass 14 is a clear glass. When the inner pane of glass 14 is clear, the inner pane of glass may have a transmission of 80-95% for visible light wavelengths of the electromagnetic spectrum when the inner pane of glass has a thickness of 6 mm. Preferably, when the inner pane of glass 14 is clear, the inner pane of glass has a transmission of about 88% for visible light wavelengths of the electromagnetic spectrum when the inner pane of glass has a thickness of 6 mm. Also, in these embodiments, the inner pane of glass 14 may have an a* value in the range of −2 to 2, a b* value in the range of −2 to 2 in the CIELAB color scale system (Illuminant D65, 10 degree observer). In other embodiments, the inner pane of glass 14 is colored.

In certain embodiments, the inner pane of glass 14 is of a grey color. In these embodiments, the inner pane of glass 14 may comprise 0.1-2.0 weight % $Fe_2O_3$ (total iron). Preferably, the inner pane of glass 14 comprises 1.2-2.0 weight % $Fe_2O_3$ (total iron). As used herein, the phrase "total iron" refers to the total weight of iron contained in the glass batch, before reduction, utilized to make the inner pane of glass. Also, in these embodiments, the inner pane of glass 14 may have an a* value of −5±5, preferably −4±3, a b* value of 0±10, preferably 4±1 and an L* of 50±10, preferably 50±5 in the CIELAB color scale system (Illuminant D65, 10 degree observer). In these embodiments, the grey inner pane of glass may have a transmission (Illuminant D65, 10 degree observer) of 50% or less for visible light wavelengths of the electromagnetic spectrum when the inner pane of glass has a nominal thickness of 6 mm. For example, in certain embodiments, the grey inner pane of glass has a transmission (Illuminant D65, 10 degree observer) of 39-48% for visible light wavelengths of the electromagnetic spectrum when the inner pane of glass has a nominal thickness of 6 mm. Alternatively, in other embodiments, the grey inner pane of glass has a transmission (Illuminant D65, 10 degree observer) of 7-11% for visible light wavelengths of the electromagnetic spectrum when the inner pane of glass has a nominal thickness of 6 mm. In still other embodiments, when the inner pane of glass 14 is of a grey color, the inner pane of glass is a sheet of glass as described in one of U.S. Pat. Nos. 5,308,805, 5,650,365 or 5,747,398, the entire disclosures of which are incorporated herein in their entirety. Preferably, when the inner pane of glass 14 is of a grey color, the inner pane of glass is a sheet of glass sold under one of the trademarks Pilkington Optifloat Grey, Pilkington Optifloat Supergrey, Pilkington Optifloat Dark Grey and sold by Pilkington or is a sheet of glass having similar optical properties.

In other embodiments, the inner pane of glass is of a grey-blue color. In such embodiments, the inner pane of glass 14 may comprise one or more colorants. For example, in an embodiment, the inner pane of glass 14 comprises 0.30-0.40 weight % $Fe_2O_3$, 46-60 ppm $Co_3O_4$, and 1-5 ppm Se. Also, when the inner pane of glass 14 is of a grey-blue color, the inner pane of glass 14 may have an a* value in the range of −4 to −2, preferably −3 to −2, a b* value in the range of −9 to −5, preferably −7 to −6 and an L* of 80-84, preferably 81-83 in the CIELAB color scale system (Illuminant D65, 10 degree observer). In these embodiments, the grey-blue inner pane of glass may have a transmission (Illuminant D65, 10 degree observer) of 55-65% for visible light wavelengths of the electromagnetic spectrum when the inner pane of glass has a nominal thickness of 6 mm. In other embodiments, when the inner pane of glass 14 is of a grey-blue color, the inner pane of glass is a sheet of glass as described in U.S. patent publication no. US 2015/0329407, the entire disclosure of which is hereby incorporated by reference in its entirety. Preferably, in these embodiments, the grey-blue colored inner pane of glass 14 is a sheet of glass sold under the trademark Pilkington Optifloat Graphite Blue and sold by Pilkington or is a sheet of glass having similar optical properties.

A conductive coating 26 is formed on the inner pane of glass 14. In certain embodiments, the conductive coating 26 is substantially transparent to visible light. The conductive coating 26 is formed over the first major surface 20 of the inner pane of glass 14. Preferably, the conductive coating 26 is formed on the first major surface 20 of the inner pane of glass 14 and has a sheet resistance of 5-50 ohm/sq. More preferably, the conductive coating 26 has a sheet resistance of 5-25 ohm/sq. Even more preferably, the conductive coating 26 has a sheet resistance of 5-15 ohm/sq.

In an embodiment, the conductive coating 26 is a pyrolytic coating. Preferably, the conductive coating 26 comprises one or more metal oxide layers deposited directly on the first major surface 20 of the inner pane of glass 14. In certain embodiments, the conductive coating 26 comprises a layer of fluorine doped tin oxide ($SnO_2$:F). In other embodiments, the conductive coating 26 comprises a layer of antimony doped tin oxide ($SnO_2$:Sb). In still other embodiments, the conductive coating 26 may comprise a layer of another conductive metal oxide material such as, for example, indium tin oxide (ITO), aluminum doped zinc oxide (ZnO:Al) or gallium doped zinc oxide (ZnO:Ga). The thickness of the conductive coating 26 and the amount of dopant provided therein can be selected to provide the desired sheet resistance exhibited by the conductive coating. Furthermore, when the conductive coating 26 comprises a layer of antimony doped tin oxide ($SnO_2$:Sb), the conductive coating may aid in reducing the visible light reflectance from the LED display 10. More particularly, in this embodiment, the visible light reflectance from the second major surface 24 of the inner pane of glass 14 may be reduced.

Preferably, the conductive coating 26 is formed on the inner pane of glass 14 utilizing a chemical vapor deposition (CVD) process such as, for example, an atmospheric pressure CVD (APCVD) process. Alternatively, the conductive coating 26 may be formed by another deposition technique such as, for example, a sputtering process or a sol-gel method. In other embodiments, the conductive coating 26 is formed in conjunction with the manufacture of the inner pane of glass 14. In one such an embodiment, the inner pane of glass 14 is formed utilizing the well-known float glass manufacturing process.

The outer pane of glass 16 is not limited to a particular thickness. Also, it is preferred that the outer pane of glass 16 is substantially transparent to visible light. In an embodiment, the outer pane of glass 16 is of a soda-lime-silica composition. However, in other embodiments, the outer pane of glass 16 may be of another composition. For example, in an embodiment, the outer pane of glass 16 may be of a borosilicate glass composition. The outer pane of glass 16 may comprise about 1000 parts per million (ppm) or less $Fe_2O_3$. In certain embodiments, it may be preferable that the outer pane of glass 16 has a low iron content as described above.

The color of the outer pane of glass 16 can vary between embodiments of the LED display 10. In an embodiment, the outer pane of glass 16 is a clear glass. When the outer pane of glass 16 is clear, the outer pane of glass may have a transmission (Illuminant D65, 10 degree observer) of 80-95% for visible light wavelengths of the electromagnetic spectrum when the outer pane of glass has a thickness of 6 mm. Preferably, when the outer pane of glass 16 is clear, the outer pane of glass has a transmission (Illuminant D65, 10 degree observer) of about 88% for visible light wavelengths of the electromagnetic spectrum when the outer pane of glass has a thickness of 6 mm. Also, in these embodiments, the outer pane of glass 16 may have an a* value in the range of −2 to 2, a b* value in the range of −2 to 2 in the CIELAB color scale system (Illuminant D65, 10 degree observer). In other embodiments, the outer pane of glass 16 may be a colored glass.

In an embodiment, an anti-reflective coating 28 is formed on the outer pane of glass 16. In this embodiment, the anti-reflective coating 28 is spaced apart from the conductive coating 26. It is preferred that the anti-reflective coating 28 is formed on the first major surface 18 of the outer pane of glass 16. Forming the anti-reflective coating 28 on the first major surface 18 of the outer pane of glass 16 reduces the visible light reflection of the LED display 10 that is measured from a side facing the outer pane of glass. In these embodiments, the visible light reflection that is measured from the side facing the first major surface 18 of the outer pane of glass 16 may be reduced in such a manner that it is less than the visible light reflection measured from the second major surface 24 of the inner pane of glass 14. In an embodiment, the visible light reflection measured from the side facing the first major surface 18 of the outer pane of glass 16 is at least 0.5% less than the visible light reflection measured from the second major surface 24 of the inner pane of glass 14. Preferably, the visible light reflection measured from the side facing the first major surface 18 of the outer pane of glass 16 is at least 1.0% less than the visible light reflection measured from the second major surface 24 of the inner pane of glass 14. More preferably, the visible light reflection measured from the side facing the first major surface 18 of the outer pane of glass 16 is at least 1.5% less than the visible light reflection measured from the second major surface 24 of the inner pane of glass 14. Even more preferably, the visible light reflection measured from the side facing the first major surface 18 of the outer pane of glass 16 is at least 2.0% less than the visible light reflection measured from the second major surface 24 of the inner pane of glass 14.

In an embodiment, the visible light reflection (Illuminant D65, 10 degree observer) measured from the side facing the first major surface 18 of the outer pane of glass 16 is 5.0% or less. Preferably, the visible light reflection (Illuminant D65, 10 degree observer) measured from the side facing the first major surface 18 of the outer pane of glass 16 is 4.0% or less. Even more preferably, the visible light reflection (Illuminant D65, 10 degree observer) measured from the side facing the first major surface 18 of the outer pane of glass 16 is 3.0% or less.

Preferably, the anti-reflective coating 28 comprises one or more metal oxide layers deposited on the first major surface 18 of the outer pane of glass 16. In an embodiment, the anti-reflective coating 28 is a pyrolytic coating. In another embodiment, the anti-reflective coating is color neutral. In this embodiment, the anti-reflective coating may comprise one or more layers that are selected to suppress color. In one such embodiment, the anti-reflective coating may comprise a layer of tin oxide ($SnO_2$) formed on the first major surface 18 of the outer pane of glass 16 and a layer of silicon dioxide ($SiO_2$) formed directly on the tin oxide layer. In this embodiment, each layer may have a thickness of 10-30 nanometers (nm). In other embodiments, the anti-reflective coating 28 comprises one or more layers of tin oxide ($SnO_2$, $SnO_2$:X) and one or more layers of silicon dioxide that are formed over the one or more layers that suppress color. For example, the anti-reflective coating 28 may be of a tin oxide/silicon dioxide/fluorine doped tin oxide/silicon dioxide arrangement or a tin oxide/silicon dioxide/tin oxide/silicon dioxide arrangement. In these embodiments, the thickness of the one or more layers of tin oxide ($SnO_2$, $SnO_2$:F) formed over the one or more layers that suppress color may be 70-150 nm and the thickness of the one or more layers of silicon dioxide formed on the one or more layers of tin oxide ($SnO_2$, $SnO_2$:F) may be 70-150 nm. In certain embodiments, the anti-reflective coating may be as described in U.S. Pat. No. 6,165,598, the entire disclosure of which is incorporated herein in its entirety.

It should be appreciated that other anti-reflective coating 28 arrangements are suitable for use in the LED display 10. For example, in other embodiments, the anti-reflective coating 28 comprises at least one layer of tin oxide ($SnO_2$, $SnO_2$:X) or titanium dioxide ($TiO_2$) and at least one layer of silicon dioxide ($SiO_2$). In these embodiments, the anti-reflective coating 28 may be of a tin oxide/silicon dioxide arrangement, a titanium dioxide/silicon dioxide arrangement, a silicon dioxide/tin oxide/silicon dioxide arrangement or a silicon dioxide/titanium dioxide/silicon dioxide arrangement.

When the anti-reflective coating 28 is of a tin oxide/silicon dioxide arrangement or a titanium dioxide/silicon dioxide arrangement, the layer comprising tin oxide or titanium dioxide is deposited over, and preferably directly on, the first major surface 18 of the outer pane of glass 16 and the layer comprising silicon dioxide is deposited over, and preferably directly on, the layer comprising tin oxide or titanium dioxide. When the anti-reflective coating 28 is of a silicon dioxide/tin oxide/silicon dioxide arrangement or a silicon dioxide/titanium dioxide/silicon dioxide arrangement, the first layer comprising silicon dioxide is deposited over, and preferably directly on, the first major surface 18 of the outer pane of glass 16. Preferably, the first layer comprising silicon dioxide is formed at a thickness of 25 nm or less. More preferably, the thickness of the layer is 10-20 nm. The layer comprising tin oxide or titanium dioxide is deposited over, and preferably directly on, the first layer comprising silicon dioxide. In embodiments where a layer comprising tin oxide is provided, the thickness of the layer may be 15-50 nm. Preferably, in these embodiments, the thickness of the layer is 15-35 nm. In embodiments where a layer comprising titanium dioxide is provided, the thickness of the layer may be 5-20 nm. In other embodiments where the layer comprises titanium dioxide, the thickness of the layer may be 15 nm or less. In these embodiments, the thickness of the layer comprising titanium dioxide is preferably 5-15 nm. The outer layer comprising silicon dioxide is deposited over, and preferably directly on, the layer comprising tin oxide or titanium dioxide. Preferably, the outer layer comprising silicon dioxide forms the outermost surface of the LED display 10. Preferably, the thickness of the outer layer comprising silicon dioxide is 100 nm or more. In an embodiment, the thickness of the outer layer comprising silicon dioxide is 100-125 nm. More preferably, in this embodiment, the thickness of the outer layer comprising silicon dioxide is 110-125 nm. In still other embodiments, the anti-reflective coating may be as described in U.S. patent publication no. US 2016/0124120, the entire disclosure of which is incorporated herein in its entirety. Additional anti-reflective coating 28 arrangements may be suitable for use in the LED display 10 as well.

The anti-reflective coating 28 may be formed on the outer pane of glass 16 utilizing a CVD process such as, for example, APCVD process. Alternatively, the anti-reflective coating 28 may be formed by another deposition technique such as, for example, a sputtering process or a sol-gel method. In an embodiment, the anti-reflective coating 28 is formed in conjunction with the manufacture of the outer pane of glass 16. In one such an embodiment, the outer pane of glass 16 is formed utilizing the well-known float glass manufacturing process.

The display assembly 10 also comprises one or more light emitting diodes (LEDs) 30, 32, 34, 35 (i.e. 30-36) provided between the inner pane of glass 14 and the outer pane of glass 16. Preferably, the LEDs 30-36 are provided over the first major surface 20 of the inner pane 14 and the conductive coating 26. In this embodiment, the LEDs 30-36 are provided on the conductive coating 26. More preferably, the LEDs 30-36 are provided directly on the conductive coating 26. However, in other embodiments (not depicted), the LEDs may be provided over another major surface of one of the panes of glass. In these embodiments, the LEDs 30-36 are encapsulated by the interlayer 12 provided between the inner pane of glass 14 and the outer pane of glass 16.

The LEDs 30-36 can be formed from any material known in the art for forming LEDs such as, for example, gallium arsenide (GaAs), gallium phosphide (GaP), or gallium arsenide phosphide (GaAsP). The number of LEDs 30-36 provided can vary depending on the amount and type of light that is desired and the size of the display 10. Preferably, the LEDs 30-36 are spaced apart from each other and are provided in a grid-like pattern. The LEDs 30-36 can be formed in a grid-like pattern by utilizing one or more known processes for the manufacture of LEDs.

The LEDs 30-36 are in electrical communication with the conductive coating 26. Current is provided to the LEDs 30-36 via the conductive coating 26. In certain embodiments, the conductive coating 26 is formed into a grid-like pattern to enable current flow to and through the LEDs 30-36. Known methods of mechanical scribing, laser scribing, and chemical etching can be utilized to provide the conductive coating 26 in a grid-like pattern.

One or more electrical connectors (not depicted) are in electrical communication with the conductive coating 26 to provide current to the LEDs 30-36. Current can be supplied to the display 10 by known methods. For example, one or more conductive wires (not depicted) can be attached to the one or more electrical connectors (not depicted) and provided in electrical communication with a power supply (not depicted) to supply current to the display 10.

Preferably, the LED display 10 comprises at least one of a colored inner pane of glass 14, an anti-reflective coating 28 on the outer pane of glass 16, and a conductive coating 26 comprising antimony doped tin oxide as described above. When at least one is provided, the colored inner pane of glass 14, the anti-reflective coating 28 on the outer pane of glass 16, and the conductive coating 26 comprising antimony doped tin oxide act as a filter allowing the LED display 10 to exhibit a flat neutral color and/or a reduced visible light reflectance. For example, in an embodiment, the visible light reflection (Illuminant D65, 10 degree observer) from the second major surface 24 of the inner pane of glass 14 is 7.6% or less. In other embodiments, the visible light reflection (Illuminant D65, 10 degree observer) from the second major surface 24 of the inner pane of glass 14 may be 7.0% or less. More preferably, the visible light reflection (Illuminant D65, 10 degree observer) from the second major surface 24 of the inner pane of glass 14 is 6.0% or less.

Additionally, when the LED display 10 comprises two or more of the colored inner pane of glass 14, the anti-reflective coating 28 on the outer pane of glass 16, and the conductive coating 26 comprising antimony doped tin oxide the visible light reflectance from the LED display may be further reduced. For example, providing the LED display 10 with a conductive coating 26 that comprises antimony doped tin oxide and a colored inner pane of glass 14 as described above may further reduce the visible light reflectance from the second major surface 24 of the inner pane of glass 14 and/or the visible light reflectance measured from a side facing the first major surface 18 of the outer pane of glass 16. In these embodiments, the visible light reflection (Illuminant D65, 10 degree observer) from the second major surface 24 of the inner pane of glass 14 may be 5.0% or less.

Thus, when the LED display 10 comprises one or more of the aforementioned features, the display exhibits improved contrast enhancement when compared with the displays known in the art and allows an image shown by the LED display 10 to be clearer when compared with the same image shown by a display known in the art. The LED display 10 is also less distracting to viewers due to the reduced reflection from the inner interfaces of the display when compared with the reflection from the inner interfaces of the displays known in the art.

It should also be noted that the LED display 10 not only exhibits a reduced reflection but also may exhibit a neutral color in reflection and/or a neutral color in transmission. For describing the embodiments of the LED display 10, exhibiting a neutral color in reflection refers to the visible light reflected to the side facing the outer pane of glass when viewed at a 90 degree angle incident from the LED display. For the purpose of describing the embodiments of the LED display, a neutral color for the light reflected from the outer pane of glass is defined under the CIELAB color scale system (Illuminant D65, 10 degree observer) with an a* value in the range of 6 to −6 and a b* value in the range of 6 to −6. It should also be noted that, for certain embodiments or applications described herein, a non-neutral reflected color may be desirable and can be exhibited by the LED display. Also, for describing the embodiments of the LED display 10, exhibiting a neutral color in transmission refers to the visible light transmitted through the display when viewed at a 90 degree angle incident from the display. For the purpose of describing the embodiments of the LED display, a neutral color for the light transmitted through the display is defined under the CIELAB color scale system (Illuminant D65, 10 degree observer) with an a* value in the range of 6 to −6 and a b* value in the range of 6 to −6. It should also be noted that, for certain embodiments or applications described herein, a non-neutral transmitted color may be desirable and can be exhibited by the LED display.

In a variant to the embodiments described above, with reference to FIG. 2a, in the LED display 10' a conductive coating 26 is provided on a carrier ply 15.

Figure 2A:
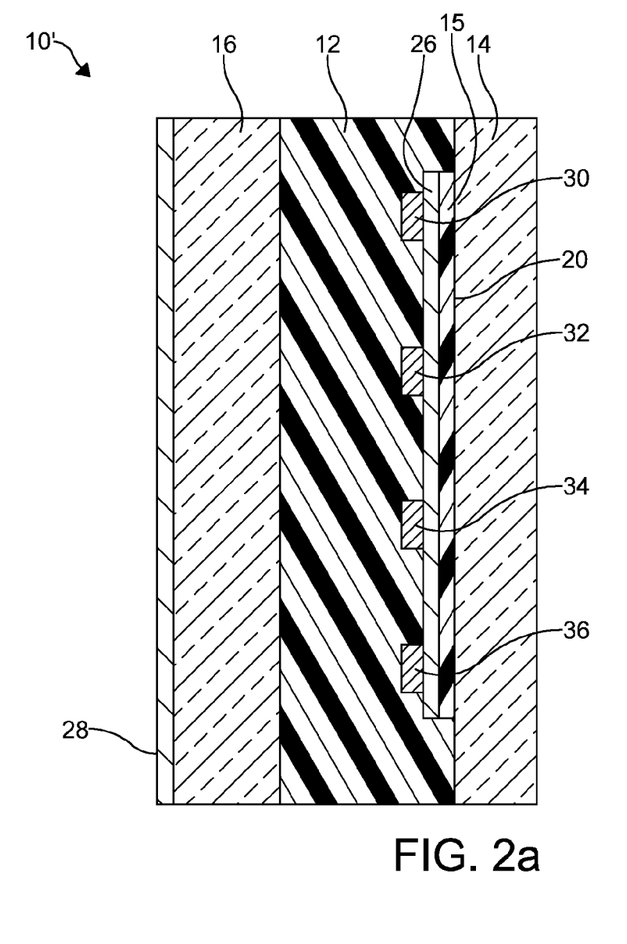
FIG. 2a is a cross-sectional view of another LED display.

In this embodiment the conductive coating 26 is transparent to visible light and has been sectionalized to provide electrically isolated regions for appropriate connection to the four LEDs 30, 32, 34, 36 (i.e. 30-36). A suitable conductive coating 26 on the carrier ply 15 is ITO.

In this embodiment the carrier ply 15 is PET and is transparent to visible light. The carrier ply 15 is not coextensive with each of the glass panes 14, 16 so it is possible to position the carrier ply 15 inboard of the periphery of the first major surface 20 of the inner pane of glass 14 and to use a single ply of interlayer 12 to adhere the carrier ply to the inner pane of glass 14. The outer pane of glass 16 is laminated to the inner pane of glass 16 via the interlayer 12. To improve adhesion an adhesive such as a pressure sensitive adhesive may be provided between the carrier ply 15 and the first major surface 20 of the inner pane 14.

An optional anti-reflection coating 28 is provided on the outer pane of glass 16.

Figure 2B:
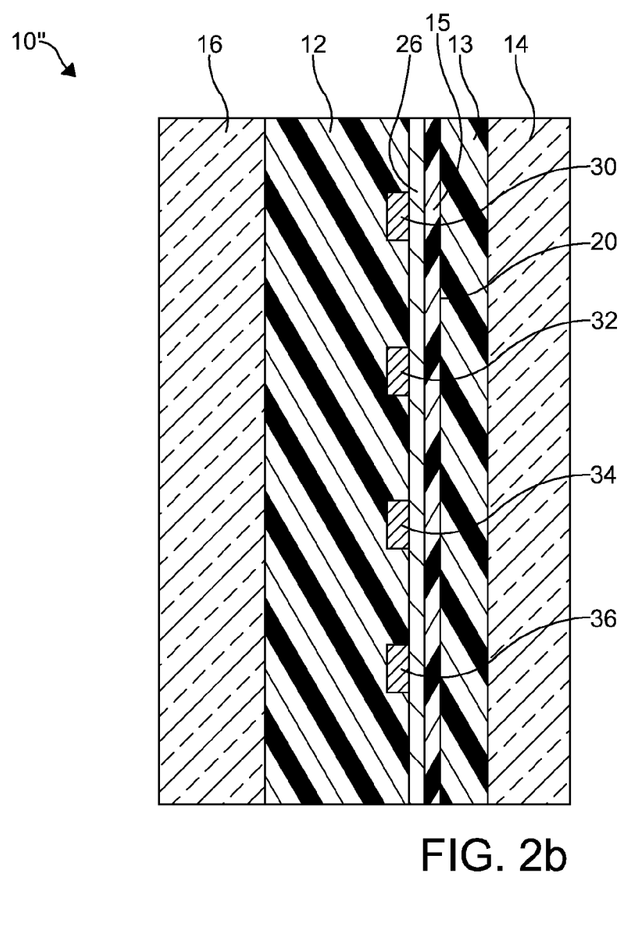
FIG. 2b is a cross-sectional view of another LED display.

FIG. 2b shows an alternative to the embodiment shown in FIG. 2a. In the LED display 10" the carrier ply 15 is coextensive with the glass panes 14, 16. In this case it is preferred to use an additional interlayer 13 between the first major surface 20 of the inner pane of glass 14 and the carrier ply 15 to laminate the carrier ply to the inner pane of glass 14. The interlayer 13 may be suitably body tinted, for example to provide a suitable transmitted color as described above. The interlayer may be PVB or EVA or other suitable material. Alternatively, or in addition to the interlayer 13, a pressure sensitive adhesive may be used in between the carrier ply 15 and the first major surface 20 of the inner pane of glass 14.

The interlayer 12 laminates the outer pane of glass 16 to the carrier ply 15. As such, in the LED display 10" the inner pane of glass 14 is laminated to the outer pane of glass 16 via the interlayer 12, the carrier ply 15 (having coating 26 and LEDs 30-36 thereon), and the interlayer 13.

In the LED display 10" the carrier ply 15 is PET and the conductive coating 26 is ITO. The carrier ply 15 is transparent to visible light.

In another alternative to the embodiment shown in FIG. 2a, the carrier ply 15 is positioned in a cut-out region in a first interlayer, and the first interlayer is positioned between second and third interlayers to aid successful lamination. This type of laminate configuration is known in the art as a "picture frame" design.

It is known that using three plies of interlayer may be especially useful for laminating electrical devices, the thickness of which is greater than approximately fifty microns. This is because when such a device is laminated between just two plies of interlayer material, one or more air bubbles around the periphery of the device may develop and remain in the finished laminated product. Air bubbles are unsightly and may, more importantly, cause problems as they migrate into the surrounding interlayer material, possibly leading to de-lamination of the glazing. The "picture frame" design provides a way of minimising such bubble problems; its construction is such that the first ply of interlayer material, which may be approximately the same thickness as the electrical device, is cut such that the device is effectively framed once positioned in the cut-out. The electrical device and its surrounding interlayer "frame", interleaved between the second and third plies of interlayer material, may then be laminated between two glass panes in known manner.

When a carrier ply is used as described above and if, instead of a transparent conductive coating, conductive tracks are used to electrically connect the LEDs, the conductive tracks (which may be optically opaque) on the carrier ply may be less visually apparent when the inner glass pane 14 has suitably low visible light transmission.

When a carrier ply is used as described above, the carrier ply may comprise at least one of PET, polyimide and glass and the conductive coating on the carrier ply may comprise ITO.

Figure 3:
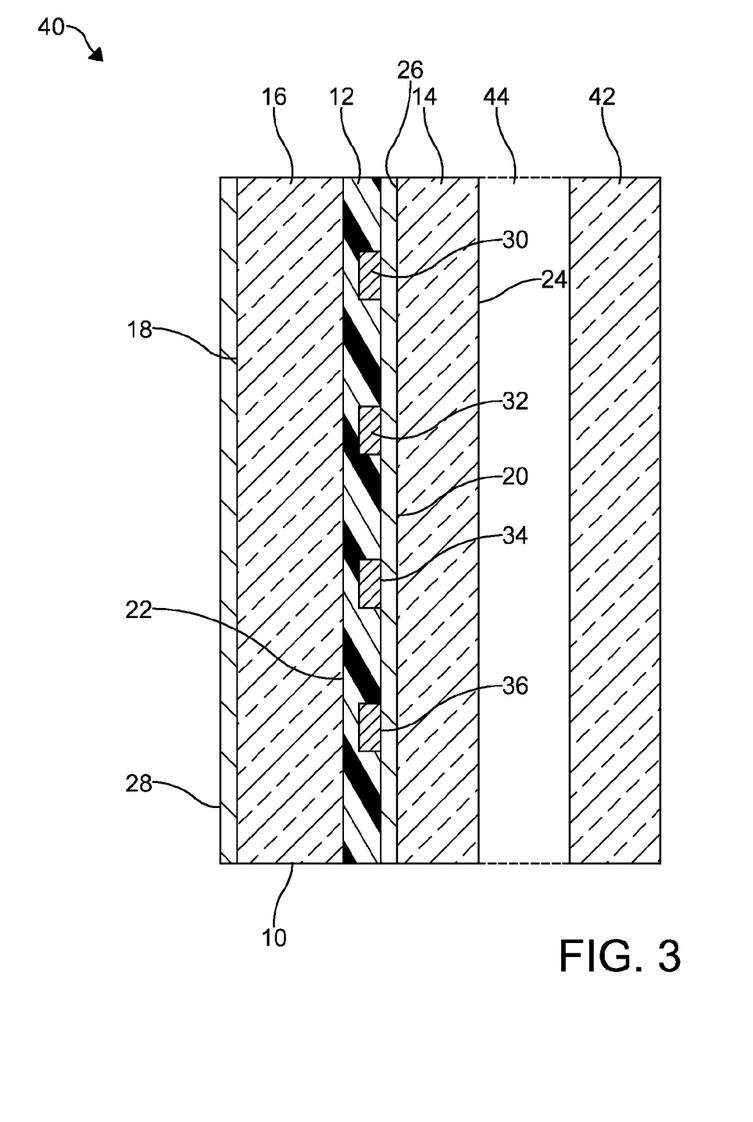
FIG. 3 is a cross-sectional view of an insulated glass unit including the LED display of FIG. 1.

Referring now to FIG. 3, in an embodiment, the LED display 10 is provided as a portion of an insulated glass unit 40. The insulated glass unit 40 exhibits a flat neutral color and reduced visible light reflectance when compared with insulated glass units having displays which are known in the art. As illustrated in FIG. 3, the LED display 10 is oriented in a parallel, spaced apart relationship with one or more additional panes of glass 42. A frame (not depicted) may be provided around the periphery of the LED display 10 and the one or more additional panes of glass 42. A spacer (not depicted) may be placed between the LED display 10 and the one or more additional panes 42 of glass in a peripheral area. The peripheral area may generally coincide with the periphery where the frame is provided. The space 44 between the LED display 10 and the one or more additional panes of glass 42 may be an air space or evacuated and filled with an inert gas such as, for example, argon.

EXAMPLES

The following examples are presented solely for the purpose of further illustrating and disclosing the embodiments of the LED display. Examples of the LED display within the scope of the invention are described below and illustrated in TABLE 1. In TABLE 1, the LED displays with the scope of the invention are Ex 1-Ex 12. Ex 1-Ex 12 are predictive. A comparative example, which is labelled as C1 in TABLE 1 and is not considered to be a part of the invention, is also described below.

Comparative Example

An LED display was formed by providing a clear outer pane of glass. The outer pane of glass was of a 6 mm thickness. The outer pane of glass was laminated to a clear inner pane of glass. The inner pane of glass was of a 6 mm thickness. A conductive coating was formed on the first major surface of the inner pane of glass. The conductive coating was substantially transparent to visible light. The transparent conductive coating comprised fluorine doped tin oxide and had a sheet resistance of 5-15 ohm/sq. One or more LEDs were provided between the inner pane of glass and the outer pane of glass and directly on the transparent conductive coating. An interlayer encapsulates the LEDs and was provided between the outer pane of glass and the inner pane of glass. The interlayer was of PVB composition, 0.9 mm in thickness, and substantially transparent to visible light.

The visible light reflection exhibited by the outer pane of glass, the reflected color exhibited by the outer pane of glass, and transmitted color through the outer pane of glass of C1 is reported in TABLE 1 and was measured using a spectrophotometer. Additionally, the visible light reflection exhibited by the inner pane of glass of C1 is reported in TABLE 1 and was measured using a spectrophotometer. In Table 1, the visible light reflection, reflected color, and transmitted color for C1 are reported according to the CIELAB color scale system, and using Illuminant D65, 10 degree observer.

Ex 1

An LED display is formed by providing a clear outer pane of glass. The outer pane of glass was of a 6 mm thickness and substantially transparent to visible light. The outer pane of glass has a low-iron composition and is laminated to an inner pane of Pilkington Optifloat Grey glass sold by Pilkington. The inner pane of glass was of a 6 mm thickness. A conductive coating is formed on the first major surface of the inner pane of glass. The conductive coating is substantially transparent to visible light. The transparent conductive coating comprises fluorine doped tin oxide and has a sheet resistance of 5-15 ohm/sq. One or more LEDs are provided between the inner pane of glass and the outer pane of glass and directly on the transparent conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 1 exhibits a neutral color and reduced visible light reflectance from both the outer pane of glass and the inner pane of glass when compared with the comparative example. Such properties allow the LED display to show an image clearly and exhibit improved contrast enhancement.

Ex 2

An LED display is formed by providing a clear outer pane of glass. The outer pane of glass was of a 6 mm thickness and substantially transparent to visible light. The clear outer pane of glass was of a low-iron composition and is laminated to an inner pane of Pilkington Optifloat Graphite Blue glass sold by Pilkington. The inner pane of glass was of a 6 mm thickness. A conductive coating is formed on the first major surface of the inner pane of glass. The conductive coating is substantially transparent to visible light. The transparent conductive coating comprises fluorine doped tin oxide and has a sheet resistance of 5-15 ohm/sq. One or more LEDs are provided between the inner pane of glass and the outer pane of glass and directly on the transparent conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 2 exhibits a neutral color and reduced visible light reflectance from the inner pane of glass when compared with the comparative example. Such properties allow the LED display to show an image clearly and exhibit improved contrast enhancement.

Ex 3

An LED display is formed by providing a clear outer pane of glass. The clear outer pane of glass has a low-iron composition and is laminated to a clear inner pane of glass. The outer pane of glass and the inner pane of glass were each of a 6 mm thickness and substantially transparent to visible light. A conductive coating is formed on the first major surface of the inner pane of glass. The conductive coating comprises antimony doped tin oxide and has a sheet resistance of 5-50 ohm/sq. One or more LEDs are provided between the inner pane of glass and the outer pane of glass and directly on the conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 3 exhibits a neutral color and reduced visible light reflectance from the inner pane of glass when compared with the comparative example. Such properties allow the LED display to show an image clearly and exhibit improved contrast enhancement.

Ex 4

An LED display is formed by providing a clear outer pane of glass. The clear outer pane of glass has a low-iron composition and is laminated to an inner pane of Pilkington Optifloat Grey glass sold by Pilkington. The outer pane of glass was of a 6 mm thickness and substantially transparent to visible light. The inner pane of glass was of a 6 mm thickness. A conductive coating is formed on the first major surface of the inner pane of glass. The conductive coating comprises antimony doped tin oxide and has a sheet resistance of 5-50 ohm/sq. One or more LEDs are provided between the inner pane of glass and the outer pane of glass and directly on the conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 4 exhibits a neutral color and reduced visible light reflectance from both the outer pane of glass and the inner pane of glass when compared with the comparative example. Such properties allow the LED display to show an image clearly and exhibit improved contrast enhancement.

Ex 5

An LED display is formed by providing a clear outer pane of glass. The clear outer pane of glass has a low-iron composition and is laminated to an inner pane of Pilkington Optifloat Graphite Blue glass sold by Pilkington. The outer pane of glass was of a 6 mm thickness and substantially transparent to visible light. The inner pane of glass was of a 6 mm thickness. A conductive coating is formed on the first major surface of the inner pane of glass. The conductive coating comprises antimony doped tin oxide and has a sheet resistance of 5-50 ohm/sq. One or more LEDs are provided between the inner pane of glass and the outer pane of glass and directly on the conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 5 exhibits a neutral color and reduced visible light reflectance from both the outer pane of glass and the inner pane of glass when compared with the comparative example. Such properties allow the LED display to show an image clearly and exhibit improved contrast enhancement.

Ex 6

An LED display is formed by providing a clear outer pane of glass. An anti-reflective coating is formed on a first major surface of the outer pane of glass. The anti-reflective coating comprised a tin oxide layer. The tin oxide layer is deposited at a thickness of 15 nm directly on the first major surface of the outer pane of glass. The anti-reflective coating also comprised a first silicon dioxide layer. The first silicon dioxide layer is deposited at a thickness of 27 nm and on the tin oxide layer. A fluorine doped tin oxide layer is deposited on the first silicon dioxide layer and at a thickness of 130 nm. A second silicon dioxide layer is deposited on the fluorine doped tin oxide layer and at a thickness of 85 nm. The clear outer pane of glass has a low-iron composition and is laminated to a clear inner pane of glass that has a low-iron composition. The outer pane of glass and inner pane of glass were each of a 6 mm thickness and substantially transparent to visible light. A conductive coating is formed on the first major surface of the inner pane of glass. The conductive coating is substantially transparent to visible light. The transparent conductive coating comprises fluorine doped tin oxide and has a sheet resistance of 5-15 ohm/sq. One or more LEDs are provided between the inner pane of glass and the outer pane of glass and directly on the transparent conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 6 exhibits a reduced visible light reflectance when compared with the comparative example. Such properties allow the LED display to show an image clearly and exhibit improved contrast enhancement.

Ex 7

An LED display is formed by providing a clear outer pane of glass. An anti-reflective coating is formed on a first major surface of the clear outer pane of glass. The anti-reflective coating comprised a tin oxide layer. The tin oxide layer is deposited at a thickness of 15 nm directly on the first major surface of the outer pane of glass. The anti-reflective coating also comprised a first silicon dioxide layer. The first silicon dioxide layer is deposited at a thickness of 27 nm and on the tin oxide layer. A fluorine doped tin oxide layer is deposited on the first silicon dioxide layer and at a thickness of 130 nm. A second silicon dioxide layer is deposited on the fluorine doped tin oxide layer and at a thickness of 85 nm. The clear outer pane of glass has a low-iron composition and is laminated to an inner pane of Pilkington Optifloat Grey glass sold by Pilkington. The outer pane of glass was of a 6 mm thickness and substantially transparent to visible light. The inner pane of glass was of a 6 mm thickness. A conductive coating is formed on the first major surface of the inner pane of glass. The conductive coating is substantially transparent to visible light. The transparent conductive coating comprises fluorine doped tin oxide and has a sheet resistance of 5-15 ohm/sq. One or more LEDs are provided between the inner pane of glass and the outer pane of glass and directly on the transparent conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 7 exhibits a reduced visible light reflectance when compared with the comparative example. Such properties allow the LED display to show an image clearly and exhibit improved contrast enhancement.

Ex 8

An LED display is formed by providing a clear outer pane of glass. An anti-reflective coating is formed on a first major surface of the clear outer pane of glass. The anti-reflective coating comprised a tin oxide layer. The tin oxide layer is deposited at a thickness of 15 nm directly on the first major surface of the outer pane of glass. The anti-reflective coating also comprised a first silicon dioxide layer. The first silicon dioxide layer is deposited at a thickness of 27 nm and on the tin oxide layer. A fluorine doped tin oxide layer is deposited on the first silicon dioxide layer and at a thickness of 130 nm. A second silicon dioxide layer is deposited on the fluorine doped tin oxide layer and at a thickness of 85 nm. The clear outer pane of glass has a low-iron composition and is laminated to an inner pane of Pilkington Optifloat Graphite Blue glass sold by Pilkington. The outer pane of glass was of a 6 mm thickness and substantially transparent to visible light. The inner pane of glass was of a 6 mm thickness. A conductive coating is formed on the first major surface of the inner pane of glass. The conductive coating is substantially transparent to visible light. The transparent conductive coating comprises fluorine doped tin oxide and has a sheet resistance of 5-15 ohm/sq. One or more LEDs are provided between the inner pane of glass and the outer pane of glass and directly on the transparent conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 8 exhibits a reduced visible light reflectance when compared with the comparative example. Such properties allow the LED display to show an image clearly and exhibit improved contrast enhancement.

Ex 9

An LED display is formed by providing a clear outer pane of glass. An anti-reflective coating is formed on a first major surface of the clear outer pane of glass. The anti-reflective coating comprised a tin oxide layer. The tin oxide layer is deposited at a thickness of 15 nm directly on the first major surface of the outer pane of glass. The anti-reflective coating also comprised a first silicon dioxide layer. The first silicon dioxide layer is deposited at a thickness of 27 nm and on the tin oxide layer. A fluorine doped tin oxide layer is deposited on the first silicon dioxide layer and at a thickness of 130 nm. A second silicon dioxide layer is deposited on the fluorine doped tin oxide layer and at a thickness of 85 nm. The clear outer pane of glass has a low-iron composition and is laminated to a clear inner pane of glass. The outer pane of glass and the inner pane of glass were each of a 6 mm thickness and substantially transparent to visible light. A conductive coating is formed on the first major surface of the inner pane of glass. The conductive coating comprises antimony doped tin oxide and has a sheet resistance of 5-50 ohm/sq. One or more LEDs are provided between the inner pane of glass and the outer pane of glass and directly on the conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 9 exhibits a reduced visible light reflectance when compared with the comparative example. Such properties allow the LED display to show an image clearly and exhibit improved contrast enhancement.

Ex 10

An LED display is formed by providing a clear outer pane of glass. An anti-reflective coating is formed on a first major surface of the clear outer pane of glass. The anti-reflective coating comprised a tin oxide layer. The tin oxide layer is deposited at a thickness of 15 nm directly on the first major surface of the outer pane of glass. The anti-reflective coating also comprised a first silicon dioxide layer. The first silicon dioxide layer is deposited at a thickness of 27 nm and on the tin oxide layer. A fluorine doped tin oxide layer is deposited on the first silicon dioxide layer and at a thickness of 130 nm. A second silicon dioxide layer is deposited on the fluorine doped tin oxide layer and at a thickness of 85 nm. The clear outer pane of glass has a low-iron composition and is laminated to an inner pane of Pilkington Optifloat Grey glass sold by Pilkington. The outer pane of glass was of a 6 mm thickness and substantially transparent to visible light. The inner pane of glass was of a 6 mm thickness. A conductive coating is formed on the first major surface of the inner pane of glass. The conductive coating comprises antimony doped tin oxide and has a sheet resistance of 5-50 ohm/sq. One or more LEDs are provided between the inner pane of glass and the outer pane of glass and directly on the conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 10 exhibits a reduced visible light reflectance when compared with the comparative example. Such properties allow the LED display to show an image clearly and exhibit improved contrast enhancement.

Ex 11

An LED display is formed by providing a clear outer pane of glass. An anti-reflective coating is formed on a first major surface of the clear outer pane of glass. The anti-reflective coating comprised a tin oxide layer. The tin oxide layer is deposited at a thickness of 15 nm directly on the first major surface of the outer pane of glass. The anti-reflective coating also comprised a first silicon dioxide layer. The first silicon dioxide layer is deposited at a thickness of 27 nm and on the tin oxide layer. A fluorine doped tin oxide layer is deposited on the first silicon dioxide layer and at a thickness of 130 nm. A second silicon dioxide layer is deposited on the fluorine doped tin oxide layer and at a thickness of 85 nm. The clear outer pane of glass has a low-iron composition and is laminated to an inner pane of Pilkington Optifloat Graphite Blue glass sold by Pilkington. The outer pane of glass was of a 6 mm thickness and substantially transparent to visible light. The inner pane of glass was of a 6 mm thickness. A conductive coating is formed on the first major surface of the inner pane of glass. The conductive coating comprises antimony doped tin oxide and has a sheet resistance of 5-50 ohm/sq. One or more LEDs are provided between the inner pane of glass and the outer pane of glass and directly on the conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 11 exhibits a reduced visible light reflectance when compared with the comparative example. Such properties allow the LED display to show an image clearly and exhibit improved contrast enhancement.

Ex 12

An LED display is formed by providing a clear outer pane of glass. An anti-reflective coating is formed on a first major surface of the clear outer pane of glass. The anti-reflective coating comprised a first silicon dioxide layer. The first silicon dioxide layer is deposited at a thickness of 15 nm directly on the first major surface of the outer pane of glass. The anti-reflective coating also comprised a titanium dioxide layer. The titanium dioxide layer is deposited at a thickness of 12 nm and on the first silicon dioxide layer. A second silicon dioxide layer is deposited on the titanium dioxide layer and at a thickness of 120 nm. The clear outer pane of glass has a low-iron composition and is laminated to an inner pane of Pilkington Optifloat Grey glass sold by Pilkington. The outer pane of glass was of a 6 mm thickness and substantially transparent to visible light. The inner pane of glass was of a 6 mm thickness. A conductive coating is formed on the first major surface of the inner pane of glass. The conductive coating is substantially transparent to visible light. The transparent conductive coating comprises fluorine doped tin oxide and has a sheet resistance of 5-15 ohm/sq. One or more LEDs are provided between the inner pane of glass and the outer pane of glass and directly on the transparent conductive coating. An interlayer encapsulates the LEDs and is provided between the outer pane of glass and the inner pane of glass. The interlayer was of PVB composition, 0.9 mm in thickness, and substantially transparent to visible light.

As illustrated by the data reported in TABLE 1, the LED display of Ex 12 exhibits a reduced visible light reflectance when compared with the comparative example. Such properties allow the LED display to show an image clearly and exhibit improved contrast enhancement.

In TABLE 1, the visible light reflection, reflected color, and transmitted color that would be measured from a side facing the first major surface of the outer pane of glass for each of the LED displays of Ex 1-Ex 12 is reported and was calculated for each example using optical modeling. Additionally, the visible light reflection exhibited by the inner pane of glass is reported for each of Ex 1-Ex 12 and was calculated using optical modeling. In TABLE 1, the visible light reflection that would be measured from the side facing the first major surface of the outer pane of glass exhibited by Ex 1-Ex 12 and C1 are listed in the column labelled $R_1$. For Ex 1-Ex 12 and C1, the color (a*, b*) of the visible light reflected that would be measured from the side facing the first major surface of the outer pane of glass is listed in the columns labelled $R_{1a*}$ and $R_{1b*}$. Also, for Ex 1-Ex 12 and C1, the color (a*, b*) of the visible light transmitted through the LED displays is listed in the columns labelled $T_{a*}$ and $T_{b*}$. The visible light reflection from the second major surface of the inner pane of glass exhibited by Ex 1-Ex 12 and C1 are listed in the column labelled $R_4$. For Ex 1-Ex 12 and C1, the color (a*, b*) of the visible light reflected from the second major surface of the inner pane of glass is listed in the columns labelled $R_{4a*}$ and $R_{4b*}$. The visible light reflection, reflected color, and transmitted color were calculated according to the CIELAB color scale system, and using Illuminant D65, 10 degree observer.

TABLE 1

| Example | $R_1$ | $R_{1a}$* | $R_{1b}$* | $T_a$* | $T_b$* | $R_4$ | $R_{4a}$* | $R_{4b}$* |
|---|---|---|---|---|---|---|---|---|
| C1 | 7.86 | −1.94 | 1.08 | — | — | 7.84 | −1.8 | 1.08 |
| Ex 1 | 7.2 | −1.67 | −0.98 | −0.42 | −0.18 | 5.6 | −0.07 | −0.86 |
| Ex 2 | 8.0 | −2.2 | −1.97 | −4.7 | −2.7 | 6.9 | −1.4 | −3.0 |
| Ex 3 | 7.9 | −4.4 | −0.5 | −2.8 | −3.8 | 7.6 | −3.5 | −1.5 |
| Ex 4 | 6.2 | −2.1 | 2.6 | −0.8 | −4.1 | 5.0 | −0.7 | −1.0 |
| Ex 5 | 6.7 | −4.0 | −0.5 | −2.8 | −8.9 | 5.7 | −1.5 | −1.2 |
| Ex 6 | 4.9 | −1.0 | −4.5 | −3.5 | 3.9 | 5.6 | 0.6 | −5.3 |
| Ex 7 | 2.5 | −0.3 | −7.5 | −0.9 | 0.4 | 4.7 | 0.1 | −1.2 |
| Ex 8 | 3.8 | −7.5 | −0.8 | −2.9 | −2.21 | 5.7 | −1.6 | −2.5 |
| Ex 9 | 3.4 | −7.2 | −0.2 | −3.2 | −1.3 | 5.8 | −3.4 | −0.5 |
| Ex 10 | 2.2 | −8.0 | 0.0 | −0.7 | 3.3 | 4.6 | −0.67 | −0.77 |
| Ex 11 | 2.7 | −7.0 | −0.5 | −1.2 | −7.4 | 4.85 | −1.5 | −1.1 |
| Ex 12 | 2.3 | −15.2 | −16.1 | −1.8 | 0.8 | 4.61 | 1.9 | −3.2 |

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A light emitting diode display, comprising:
an inner pane of glass having a first major surface and a second major surface, wherein a visible light reflection, Illuminant D65, 10 degree observer, from the second major surface of the inner pane of glass is 7.6% or less;
an outer pane of glass in a parallel relationship with the inner pane of glass;
one or more light emitting diodes provided between the inner pane of glass and the outer pane of glass; and
a first interlayer provided between the inner pane of glass and the outer pane of glass, wherein the first interlayer encapsulates the one or more light emitting diodes.

2. The light emitting diode display according to claim 1 wherein a conductive coating is formed over the first major surface of the inner pane of glass and at least a first light emitting diode of the one or more light emitting diodes is provided on the conductive coating, the first light emitting diode being in electrical communication with the conductive coating.

3. The light emitting diode display according to claim 2, wherein the conductive coating is in direct contact with the first major surface of the inner pane of glass.

4. The light emitting diode display according to claim 2, wherein the conductive coating is in the form of at least one track.

5. The light emitting diode display according to claim 2, wherein the conductive coating is divided into at least first and second electrically insulated regions, and the first light emitting diode is in electrical communication with the first and second regions of the conductive coating.

6. The light emitting diode display according to claim 2, wherein the conductive coating is transparent to visible light.

7. The light emitting diode display according to claim 1 wherein a conductive coating is formed on a carrier ply, and at least a first light emitting diode of the one or more light emitting diodes is provided on the conductive coating on the carrier ply, the first light emitting diode being in electrical communication with the conductive coating on the carrier ply.

8. The light emitting diode display according to claim 7, further comprising a second interlayer, the carrier ply being between the first interlayer and second interlayer, the second interlayer being between the carrier ply and the inner pane of glass.

9. The light emitting diode display according to claim 2, wherein at least one of the one or more light emitting diodes is provided directly on the conductive coating and/or wherein the conductive coating comprises fluorine doped tin oxide or antimony doped tin oxide and has a sheet resistance of 5-50 ohm/sq.

10. The light emitting diode display according to claim 1, wherein visible light reflection, illuminant D65, 10 degree observer, from the second major surface of the inner pane of glass is 7.0% or less and/or wherein the color, illuminant D65, 10 degree observer, of the light transmitted through the display has an a* value in the range of 6 to −6 and a b* value in the range of 6 to −6.

11. The light emitting diode display according to claim 1, wherein the outer pane of glass is clear and has an a* value in the range of −2 to 2 and a b* value in the range of −2 to 2 in the CIELAB color scale system, Illuminant D65, 10 degree observer, and/or wherein the inner pane of glass is of a grey color and comprises 1.2-2.0 weight % $Fe_2O_3$ and/or wherein the inner pane of glass is of a grey-blue color and has an a* value in the range of −4 to −2 and a b* value in the range of −9 to −5 in the CIELAB color scale system, illuminant D65, 10 degree observer.

12. The light emitting diode display according to claim 1, wherein the inner pane of glass has a visible light transmission, illuminant D65, 10 degree observer, of 39-48% or of 55-65%.

13. The light emitting diode display according to claim 1, further comprising an anti-reflective coating formed on the first major surface of the outer pane of glass.

14. The light emitting diode display according to claim 13, wherein the anti-reflective coating comprises at least one layer of tin oxide or titanium dioxide and at least one layer of silicon dioxide.

15. The light emitting diode display according to claim 13, wherein the anti-reflective coating is color neutral and a visible light reflection, illuminant D65, 10 degree observer, measured from a side facing the first major surface of the outer pane of glass is 5.0% or less.

16. A light emitting diode display, comprising:
an inner pane of glass having a first major surface;
an outer pane of glass in a parallel relationship with the inner pane of glass;
an anti-reflective coating formed on a first major surface of the outer pane of glass, wherein a visible light reflection measured from a side facing the first major surface of the outer pane of glass is less than a visible light reflection from a second major surface of the inner pane of glass;
a conductive coating spaced apart from the anti-reflective coating;
one or more light emitting diodes provided between the inner pane of glass and the outer pane of glass, the one or more light emitting diodes being in electrical communication the conductive coating; and
a first interlayer provided between the inner pane of glass and the outer pane of glass, wherein the first interlayer encapsulates the one or more light emitting diodes.

17. The light emitting diode display according to claim 16, wherein the conductive coating is formed on the first major surface of the inner pane of glass or wherein the conductive coating is formed on a carrier ply.

18. The light emitting diode display according to claim 16, wherein the visible light reflection measured from the side facing the first major surface of outer pane of glass is at least 0.5% less than the visible light reflection from the second major surface of the inner pane of glass and/or wherein the inner pane of glass is of a grey color or a grey-blue color and the visible light transmitted through the display has an a* value in the range of 6 to −6 and a b* value in the range of 6 to −6 in the CIELAB color scale system, illuminant D65, 10 degree observer.

19. A light emitting diode display, comprising:
an inner pane of glass;
an outer pane of glass in a parallel relationship with the inner pane of glass;
a conductive coating formed on a first major surface of the inner pane of glass and being divided into at least a first and a second electrically insulated region, wherein the conductive coating comprises an antimony doped tin oxide layer and has a sheet resistance of 5-50 ohm/sq.;

one or more light emitting diodes provided between the inner pane of glass and the outer pane of glass; and a first interlayer provided between the inner pane of glass and the outer pane of glass, wherein the first interlayer encapsulates the one or more light emitting diodes and wherein the one or more light emitting diodes is in electrical communication with the first and second electrically insulated regions of the conductive coating formed on the first major surface of the inner pane of glass.

20. The light emitting diode display according to claim 19, wherein the one or more light emitting diodes are in electrical communication the conductive coating on the first major surface of the inner pane of glass or wherein the one or more light emitting diodes are mounted on a carrier ply, the carrier ply being provided with a conductive coating for providing electrical power to at least one of the one or more light emitting diodes.

* * * * *